United States Patent [19]

Hogan

[11] Patent Number: 5,235,009
[45] Date of Patent: Aug. 10, 1993

[54] GAS PHASE POLYMERIZATION IN MULTI-STAGE FLUID BEDS

[75] Inventor: John P. Hogan, Bartlesville, Okla.

[73] Assignee: Phillips Petroleum Company, Bartlesville, Okla.

[21] Appl. No.: 422,982

[22] Filed: Oct. 16, 1989

[51] Int. Cl.$^5$ ............................................. C08F 2/34
[52] U.S. Cl. ........................................ 526/65; 526/88
[58] Field of Search ......................................... 526/65

[56] References Cited

U.S. PATENT DOCUMENTS

| | | | |
|---|---|---|---|
| 2,467,802 | 4/1949 | Barr | 526/65 |
| 2,596,611 | 5/1952 | Weidman et al. | 252/439 |
| 2,749,218 | 6/1956 | Heath | 23/200 |
| 2,799,558 | 7/1957 | Smith et al. | 23/142 |
| 2,936,303 | 5/1960 | Goins | 526/65 |
| 3,079,222 | 2/1963 | Reeve | 23/1 |
| 3,625,932 | 12/1971 | Green | 260/92.8 |
| 3,770,714 | 11/1973 | Dorschner et al. | 260/93.7 |
| 3,776,979 | 12/1973 | Hill | 260/373 B |
| 3,910,769 | 10/1975 | Mayer et al. | 23/284 |
| 3,931,134 | 1/1976 | Hartmann et al. | 260/93.7 |
| 4,003,712 | 1/1977 | Miller | 23/288 S |
| 4,380,615 | 4/1983 | Sauerbrunn | 526/65 |
| 4,703,094 | 10/1987 | Raufast | 526/65 |
| 4,710,538 | 12/1987 | Jorgensen | 525/53 |

OTHER PUBLICATIONS

Applied Industrial Catalysis, vol. 1, pp. 164-166, Bruce E. Leach, Ed., Academic Press, 1983.

Primary Examiner—Joseph L. Schofer
Assistant Examiner—T. R. Weber
Attorney, Agent, or Firm—Dougherty, Hessin, Beavers & Gilbert

[57] ABSTRACT

Processes are disclosed for the vapor phase polymerization of gaseous monomers, particularly olefins such as propylene and ethylene. A gaseous stream containing at least one gaseous monomer is passed upwardly through a series of fluidized bed reaction zones of successively smaller diameter. A polymerization catalyst is introduced into an uppermost one of said zones. The gaseous monomer is polymerized to form solid polymer particles which are a part of a fluidized bed in each zone, and which flow downwardly through the series of reaction zones, thereby decreasing a volumetric flow rate of the upwardly flowing gaseous stream as the stream moves upward. A velocity of the upwardly flowing gaseous stream is maintained at a sufficient level to fluidize the fluidized bed in each successive zone at least partially by means of the smaller diameter of each successive zone. Techniques are disclosed for dividing zones into subzones thus multiplying the effective number of stages of the reactor.

9 Claims, 2 Drawing Sheets

GAS PHASE POLYMERIZATION IN MULTI-STAGE FLUID BEDS

BACKGROUND OF THE INVENTION

1. Field Of The Invention

The present invention relates to gas phase polymerization processes utilizing multi-stage fluid beds, and particularly, but not by way of limitation, to such processes adapted for the production of olefin polymers such as polyethylene or polypropylene.

2. Description Of The Prior Art

In a typical presently operating gas phase ethylene or propylene polymerization plant, polymerization is done in a single fluidized bed and the effluent is cooled and recycled. In the case of ethylene polymerization, the recycle rate is fifty to sixty pounds of ethylene per pound of polymer produced. The purpose of this recycling is to remove the heat of reaction of the polymer which is approximately 1460 btu/lb. Such single bed processes have significant disadvantages. First, elaborate and expensive recycle equipment is required and the recycled stream may become contaminated. Second, in a single fluidized bed, catalyst is injected and mixes with the polymer, and therefore some of the catalyst is discharged along with the polymer before it has a chance to make much if any polymer. Therefore, efficiency is limited and the product is very heterogeneous.

Such a single stage fluidized bed reactor for olefin polymerization is disclosed in U.S. Pat. No. 4,003,712 to Miller.

It is also known that multiple stage vertically stacked fluidized bed reactors can be utilized for olefin polymerization. U.S. Pat. No. 2,936,303 to Goins, and assigned to Phillips Petroleum Company, the assignee of the present invention, discloses such a multi-stage polymerization process. Gaseous olefins are fed into the lower stage, and a fine particulate catalyst is fed into the upper stage. The gaseous stream flows upward and is steadily converted to polymer particles which flow downward by gravity through the stages of the reactor.

U.S. Pat. No. 2,467,802 to Barr discloses a multistage reactor having stages of successively decreasing diameter from bottom to top, but this disclosure is not involved with polymerization processes. Instead it deals with synthesis of hydrocarbons. The two processes are very different. In the present invention the gaseous monomer is injected into the lowermost stage, and as it flows upward it is continuously converted to solid polymer particles which in fact make up the fluidized bed and then flow downward through the series of fluidized beds and exit from the lowermost bed. In the hydrocarbon synthesis process of the '802 patent, on the other hand, the gases supplied to the lowermost stage react to convert into hydrocarbons which continue their upward flow. The downward flow through the fluidized beds of the '802 patent is solely catalyst material which becomes increasingly deactivated as it travels downward through the reactor.

SUMMARY OF THE INVENTION

The present invention provides an improved multi-stage process for the vapor phase polymerization of a gaseous monomer, and particularly of a gaseous olefin such as ethylene or propylene.

A gaseous stream containing at least one gaseous monomer is passed upwardly through a series of fluidized bed reaction zones of successively smaller diameter. A polymerization catalyst is introduced into an uppermost one of the zones. The gaseous monomer is polymerized to form solid polymer particles which are a part of a fluidized bed in each zone, and which then flow downwardly through the series of zones. Due to the conversion of the gaseous monomer in the upwardly flowing stream to solid polymer particles which fall out of the stream, there is a continuously decreasing volumetric flow rate of the upwardly flowing gaseous stream as it moves upward.

In order to maintain a velocity of the upwardly flowing gaseous stream sufficient to properly fluidize the fluidized bed in each upwardly successive reaction zone, the diameter of each upwardly successive reaction zone is reduced.

In another preferred aspect of the process, one or more of the reaction zones is divided into a plurality of subzones by divider walls having openings therethrough. The particles are first passed into a first subzone, and then passed laterally through openings in the divider wall to a second subzone, while any substantial back flow of particles from the second subzone to the first subzone is prevented. This effectively multiplies the number of stages through which the polymer particles pass, and thus additionally increases the homogeneity of the resulting polymer particle product.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENT

Figure 1:
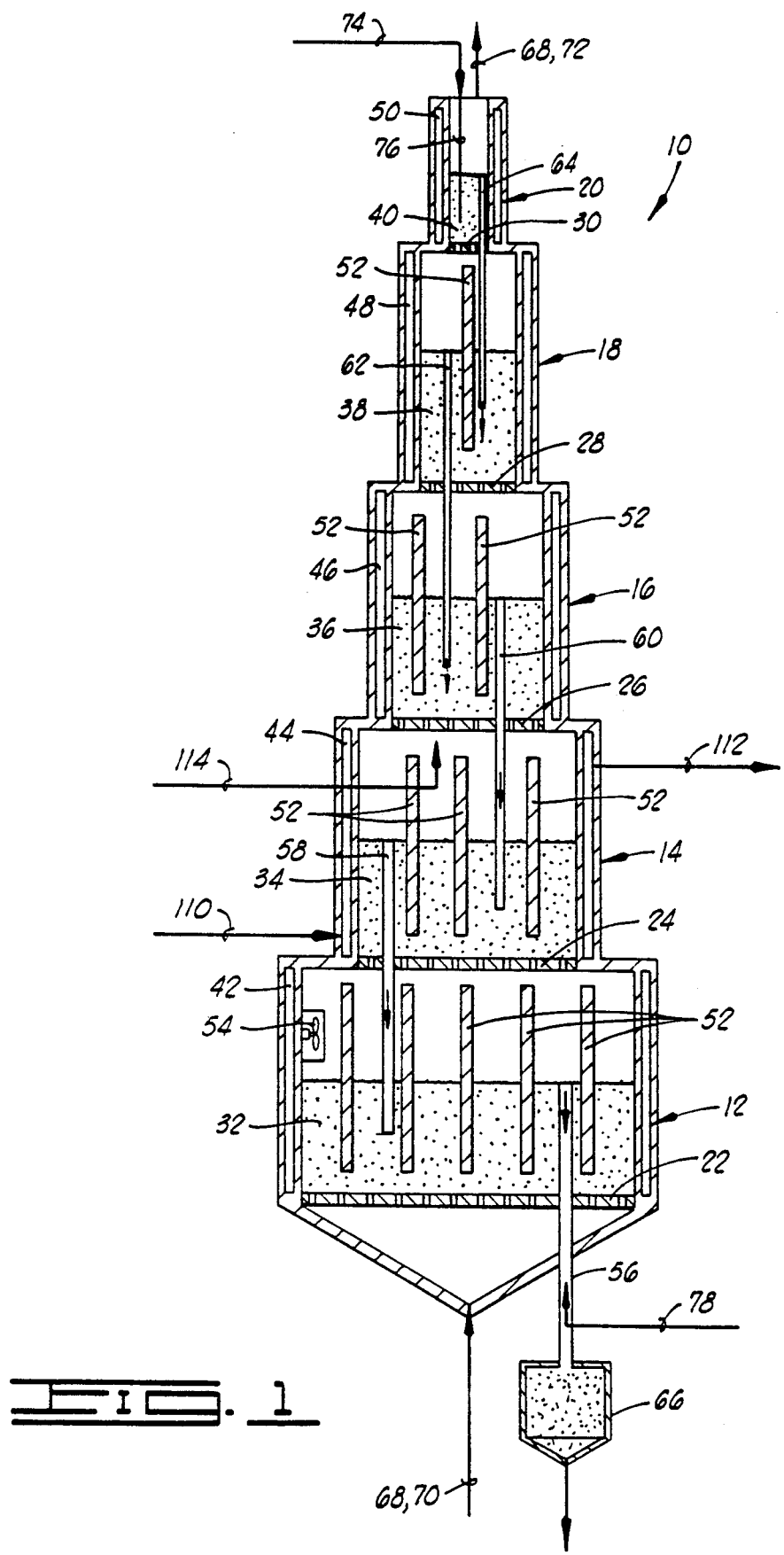
FIG. 1 is a schematic elevation sectioned view of a multi-stage reactor in which the inventive process is carried out.

Turning now to the drawings, and particularly to FIG. 1, a multi-stage reactor suitable for carrying out the process of the present invention is shown and generally designated by the numeral 10. The reactor 10 includes a plurality of vertically stacked stages 12, 14, 16, 18 and 20 of successively smaller diameter from the lowermost stage 12 to the uppermost stage 20.

The reactor stages 12–20 each have a perforated gas distribution plate 22, 24, 26, 28 and 30, respectively, spanning the lower end thereof for distributing upwardly flowing gases throughout the fluidized bed of the reactor.

The reactor stages 12–20 contain fluidized beds of polymer particles therein which are designated as 32, 34, 36, 38, and 40, respectively.

Each of the reactor stages 12–20 is surrounded by a cooling jacket through which water, hydrocarbon or other cooling liquid is passed, and the cooling jackets are designated as 42, 44, 46, 48 and 50, respectively.

Additionally, plate coil heat exchangers 52 may be utilized in any one or more of the fluidized beds. The plate coil heat exchangers 52 are partially submerged in their respective fluidized beds and extend partially above their respective fluidized beds. A mechanical means such as the blower schematically illustrated at 54 may be utilized to laterally circulate gases above each fluidized bed to improve heat transfer to the plate coil heat exchangers 52 and the surrounding cooling jacket such as 42.

Each of the fluidized beds 32–40 has a downcomer tube associated therewith which determines the depth of the bed by allowing gravity flow of the fluid particles through the downcomer tube to the next lower stage. These downcomer tubes associated with fluidized beds 32–40 are designated as 56, 58, 60, 62 and 64, respectively.

The downcomer tube 56 associated with the lowermost fluidized bed 32 leads to a surge vessel 66 from which polymer particles are intermittently let down to atmospheric pressure and discharged.

A small stream 78 of nitrogen gas is injected upwardly through the lowermost downcomer tube 56 to back flush the downcomer tube 56, thereby preventing loss of gaseous monomer.

A gaseous stream 68 containing at least one gaseous monomer is passed upwardly through the reactor 10 through the series of fluidized bed reaction zones 12–20 of successively smaller diameter. The gaseous stream 68 enters the bottom of lowermost reaction zone 12 at 70, and exits the top of uppermost reaction zone 20 at 72.

In a typical olefin polymerization process, the gaseous stream 68 entering the reactor 10 at 70 would include gaseous ethylene and/or gaseous propylene along with a diluent gas such as hydrogen.

A polymerization catalyst is introduced into the uppermost reaction zone 20 at 74 through a downcomer tube 76.

The gaseous monomer flowing upwardly in stream 68 is polymerized within the reactor 10 to form the solid polymer particles making up the various fluidized beds 32–40 in each of the zones 12–20, respectively. These polymer particles flow downwardly through the successive series of reaction zones 40, 38, 36, 34 and 32, and continue to grow in size as they progress downwardly from one zone to the other. The polymer particles are finally discharged from the lowermost fluidized bed 32 through its downcomer tube 56 to the surge vessel 66.

As the monomer material from the upwardly flowing stream is converted into solid polymer particles, the volumetric flow rate of the upwardly flowing gaseous stream 68 decreases due to this conversion of material.

In order to maintain the upward velocity of the gaseous stream 68 at a rate sufficient to fluidize the fluidized beds in each successive zone, the diameters of each upwardly successive zone are reduced as schematically illustrated in FIG. 1.

In dimensioning the various stages of the reactor 10 for a specific process, two phenomena must be kept in mind. The conversion of the upwardly flowing gas stream to polymer particles which become part of a downwardly flowing solid polymer particle stream affects the necessary size of each stage in two ways. First, the continuously decreasing upward volumetric flow rate of the gas stream 68 decreases the gas available to fluidize each upwardly successive stage. Accordingly, to maintain gas velocities, the diameter of each upwardly successive stage is reduced. Second, the polymer particles are growing in size and volume as they move downwardly through the various stages of the reactor. As the catalyst which is introduced at 74 becomes coated with polymer and those polymer particles grow, the volume of the solid polymer particles exiting the lowermost bed 32 as compared to the volume of catalyst introduced into the uppermost bed 40 increases in the range of about 3,000 to 10,000 times as the catalyst becomes coated with polymer. Very conservatively it can be said that a volumetric downward flow rate of polymer particles increases by a factor of at least 1000 from uppermost zone 20 to the lowermost zone 12.

The increasing size and volume of each downwardly successive stage of the reactor must accommodate this increasing volume of the stream of solids, and must provide a sufficient residence time within the reactor for the desired productivity of 3,000–10,000 lb. of polymer per lb. of catalyst, for example, to occur. The residence time of the solid polymer particles within each stage is determined by the volume of the stage, which of course depends both on the diameter and the depth of the bed.

Generally speaking, the upwardly flowing gas velocity necessary to fluidize each bed will determine the diameter of that bed. Then, to accommdate the desired residence time of the downwardly moving solid particles, the depth of the bed will be adjusted to provide a sufficient volume to achieve that desired residence time.

As a result of the very large increase in volume of solid materials in the process illustrated in FIG. 1, there is a very dramatic change in cross-sectional area from the uppermost stage 20 to the lowermost stage 12. The cross-sectional area of the lowermost stage 10 may be as high as one hundred or more times the cross-sectional area of the uppermost stage 20.

The diameter of each bed will be determined by the known kinetics of the reaction. That is, the amount of gaseous monomer remaining from the final polymerization bed 32 must fluidize the next bed up 34, so that the diameter of the bed 34 of stage 14 must be sized to give the proper range of linear velocity, typically from about 0.8 to about 2.0 feet per second, of the upwardly flowing gaseous stream through stage 14 to fluidize the next upper bed 34. Each bed up from the bottom is therefore sized to give the right linear velocity, as determined by its diameter, and the desired residence time, as determined by depth plus diameter, so that the overall residence time and production rate desired can be achieved.

As mentioned, each bed has a drilled or perforated gas distribution plate at its lower end which acts as a gas distributor. The gas distribution plates also act as fluid bed supports. Pressure drop through the gas distribution plates should equal to 10% to 25% of the pressure drop through its respective bed to allow for even gas distribution and smooth fluidization of the polymer particles contained in the bed.

The catalyst is first introduced into the uppermost fluidized bed 40. Typical catalysts which will be utilized in the gas phase polymerization of olefins such as propylene and ethylene are Cr-based such as Cr-silica catalyst, and also Ziegler type catalysts can be employed. Such catalysts must be conditioned or activated before they begin to form polymer particles. This activation is done for example by reduction of Cr with the monomer such as ethylene, thus forming oxygenated organic reaction products such as aldehydes which can contaminate active catalysts if it comes into contact therewith. The activity of such catalysts in a process like that illustrated increases as the catalyst moves downward through the series of fluidized bed reaction zones.

Preferably, fresh polymerization catalyst is fed to the uppermost reaction zone 20 in intermittent pulses, since most catalyst feeding devices work in this manner. Typically fresh catalysts require a short period of contact with the gaseous monomer before onset of polymerization. Therefore, the uppermost reaction zone 20 is preferably sized so that the fresh catalyst introduced therein is properly fluidized and has sufficient residence time to become active before passing down to the next lower bed 38. Thus, the potentially contaminating reaction products from the activation reactions can be swept out of the uppermost zone 20 by the upwardly flowing gaseous stream 68 without contaminating already active catalyst which is already producing polymer particles in the lower reaction beds. The concentration of nitrogen from the aforementioned back flush stream 78 is now fairly high, making this sweeping out action quite effective.

A substantial amount of heat is generated in polymerization processes like those described, and this heat must be removed to maintain good temperature control and freedom from polymer fusion. For example, the heat of reaction in ethylene polymerization is about 1460 btu/lb. Using the process illustrated in FIG. 1, this heat removal can be accomplished without any external recycle of effluent, whether it be effluent gas or effluent polymer particles from the reactor 10. In the embodiment of FIG. 1, this heat removal is accomplished by the external jackets 42-50 and/or by the internally located heat exchanger plates 52. Also as mentioned, heat transferred to the plates 52 can be improved by the use of a blower such as 54 to create turbulence and gas flow laterally through the space above each bed.

When applied to the polymerization of olefins such as ethylene or propylene, the process can typically be operated at temperatures on the order of 50° to 120° C., depending upon polymer density, and pressures on the order from 100 to 500 psig, although pressures in the range of about 200 to 400 psig are preferred.

The process just described provides for an efficient use of catalyst. It also results in a solid polymer particle product which is very homogeneous in size and catalyst content due to its controlled residence time in the various stages of reactor 10, particularly as compared to the polymer products which result from single bed reactors.

In the preferred process illustrated in FIG. 1, there is no recycling of effluent gas for cooling of the fluidized beds, and the velocity of the upwardly flowing gaseous stream 68 is maintained substantially completely by means of the smaller diameter of each upwardly successive reaction zone.

It is possible, however, to utilize the multi-stage reactor 10 having a series of reaction zones of a successively smaller diameter, in combination with some recycling of effluent gases for cooling. Also, as discussed below regarding copolymerization processes, supplemental gaseous monomer may be charged to intermediate stages of the reactor 10 thus affecting the upward volumetric flow rate of gaseous stream 68. In either such instance, the upward velocity of the gaseous stream is still maintained at least partially by means of the smaller diameters of each upwardly successive zone, but it is also partially maintained by the flow rate of the effluent gases which are recycled to the various zones for cooling or by the flow rate of the supplemental gaseous monomer.

CREATION OF SUBZONES WITHIN A REACTOR ZONE

Figure 2:
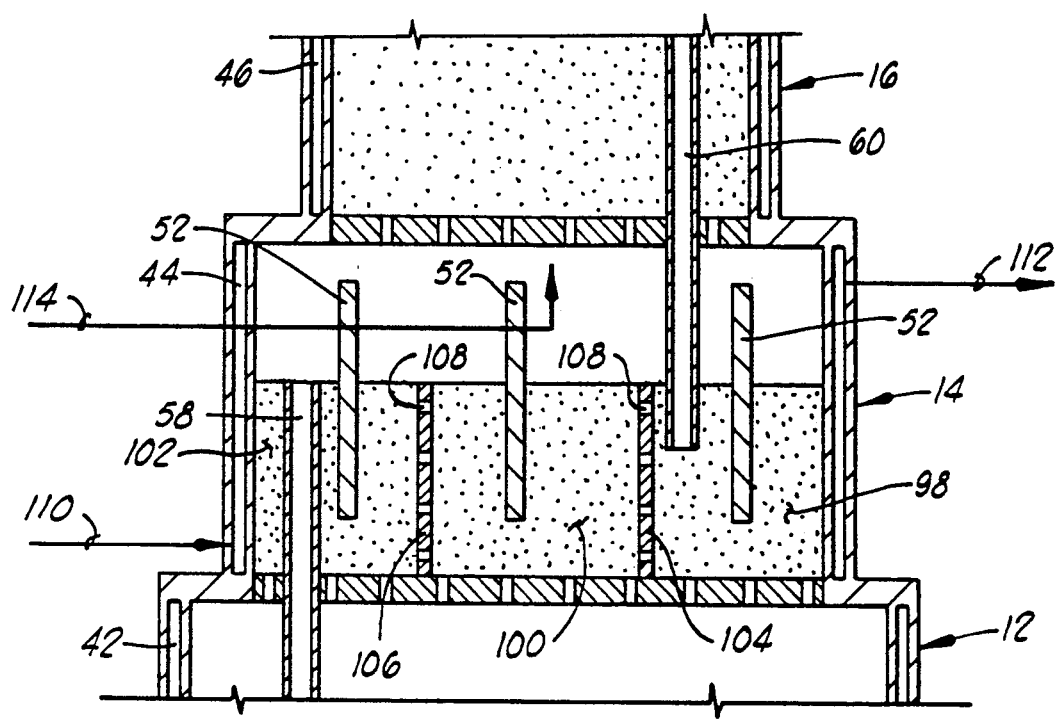
FIG. 2 is an enlarged schematic elevation sectioned view of one of the intermediate stages of the reactor of FIG. 1, illustrating the use of divider walls for dividing the fluidized bed reaction zone into a plurality of subzones.

FIG. 2 illustrates another feature of the present invention which can be utilized to effectively increase the number of stages through which the polymer particles pass. FIG. 2 is an enlarged view of the intermediate stage 14 of reactor 10 of FIG. 1.

The reaction zone 14 is divided into first, second and third subzones 98, 100 and 102 by first and second divider walls 104 and 106.

The first divider wall 104 has openings 108 therethrough of dimensions larger than the dimensions of the solid polymer particles when they are first introduced into first subzone 98 of reaction zone 14. Due to the generally downward flow of the polymer particles from one reaction zone to another, it will be seen that as schematically illustrated in FIG. 2, the polymer particles in the reaction zone 14 which are first introduced into first subzone 98 will flow generally laterally and successively from first subzone 98 to second subzone 100 to third subzone 102. The polymer particles which were first introduced into first subzone 98, will move laterally through the openings 108 of first divider wall 104 into second subzone 100. Some of these particles may also overflow over the top of first divider wall 104 to reach the second subzone 100.

The lateral flow in the general direction from right to left as schematically illustrated in FIG. 2 through the subzones 98, 100 and 102 is permitted by the openings such as 108 in the divider walls 104 and 106. Any substantial backflow of particles from downstream subzones such as 100 to upstream subzones such as 98, however, is substantially prevented by the divider walls 104 and 106 themselves.

Thus, the number of stages provided in the reactor 10 is effectively increased thereby providing a further increase in the homogeneity of the resulting solid polymer particles.

The polymer particles exit the reaction zone 14 from a lattermost one 102 of the subzones to move down to the next downwardly adjacent reaction zone 12.

In the enlarged view of FIG. 2, cooling fluid inlet and exit lines 110 and 112 are also illustrated which are associated with the cooling jacket 44. Similar cooling fluid inlet and exit lines will be associated with each of the cooling jackets 42-50 of the reactor 10 in FIG. 1, although they have not been illustrated in FIG. 1 in the interest of simplifying FIG. 1.

Copolymerization Processes

The multi-stage processes just described are particularly useful in copolymerization processes such as for example copolymers formed from ethylene and propylene.

In copolymerization with Cr-silica catalysts in a single bed reactor, the lowest molecular weight fractions contain a preponderance of branching. See *Applied Industrial Catalysis*, Vol. 1, pp. 164–166, Bruce E. Leach, Ed., Academic Press, 1983, which is incorporated herein by reference. When utilizing the multi-stage reactor of FIG. 1, this can be modified to obtain a more uniform product. In the upper beds where the lowest molecular weight polymer is made over fresh catalyst, comonomer concentrations can be kept low. In the lower beds where molecular weights are higher, comonomer concentrations can be kept high.

The monomer to comonomer ratio from bed to bed can be modified by feeding additional ethylene or propylene, thus controlling the distribution of branching between lower and higher molecular weights. For example, an additional volume of a chosen one of the gaseous monomers can be introduced to intermediate reaction zone 16 by a supplemental gaseous monomer charge line 114. The lower molecular weights will be made in the upper beds and the higher molecular weights will be made in the lower beds.

Thus it is seen that the processes of the present invention readily achieve the ends and advantages mentioned as well as those inherent therein. While certain preferred embodiments of the invention have been illustrated and described for purposes of the present disclosure, numerous changes may be made by those skilled in the art which changes are encompassed within the scope and spirit of the present invention as defined by the appended claims.

What is claimed is:

1. A process for vapor phase polymerization of a gaseous monomer, comprising:
   (a) passing a gaseous stream containing at least one gaseous upwardly through a series of fluidized bed reaction zones of successively smaller diameter;
   (b) introducing a polymerization catalyst into an uppermost one of said zones;
   (c) polymerizing said gaseous monomer to form solid polymer particles which are a part of a fluidized bed in each zone and which flow downwardly through the series of reaction zones, and thereby decreasing a volumetric flow rate of said upwardly flowing gaseous stream as said stream moves upward;
   (d) maintaining a velocity of said upwardly flowing gaseous stream sufficient to fluidize the fluidized bed in each successive zone at least partially by means of the smaller diameter of each successive zone;
   wherein at least one of said reaction zones is divided into a plurality of subzones by at least one divider wall having openings therethrough of dimensions larger than said solid polymer particles when said particles are first introduced into said one reaction zone, and said method further comprises steps of:
   passing said polymer particles downward from an upwardly adjacent reaction zone into a first one of said subzones; and
   passing said polymer particles laterally through said openings of a first one of said divider walls to a second one of said subzones while preventing any substantial backflow of particles from said second subzone to said first subzone.

2. The process of claim 1, further comprising the steps of:
   passing said polymer particles laterally through the openings of a second one of said divider walls to a third one of said subzones while preventing any substantial backflow of particles from said third subzone to said second subzone.

3. The process of claim 1, further comprising the step of:
   passing said polymer particles downward from a lattermost one of said subzones to a downwardly adjacent zone.

4. A process for vapor phase polymerization of a gaseous monomer, comprising:
   (a) passing a gaseous stream containing at least one gaseous monomer upwardly through a series of fluidized bed reaction zones of successively smaller diameter;
   (b) introducing a polymerization catalyst into an uppermost one of said zones;
   (c) polymerizing said gaseous monomer to form solid polymer particles which are a part of a fluidized bed in each zone and which flow downwardly through the series of reaction zones, and thereby decreasing a volumetric flow rate of said upwardly flowing gaseous stream as said stream moves upward;
   (d) maintaining a velocity of said upwardly flowing gaseous stream sufficient to fluidize the fluidized bed in each successive zone at least partially by means of the smaller diameter of each successive zone; and
   (e) removing heat from each of said fluidized beds by means of walled heat exchangers having a cooling fluid passing therethrough, thereby eliminating any need for recycling of effluent.

5. The process of claim 4, wherein:
   said walled heat exchangers are partially submerged in said fluidized beds and partially extend above said fluidized beds; and
   said process further includes a step of laterally circulating by mechanical means, gases above each fluidized bed to improve heat transfer to said walled heat exchangers.

6. A copolymerization process for vapor phase polymerization of gaseous monomers, comprising:
   (a) passing a gaseous stream containing at least a first and a second gaseous monomer upwardly through a series of fluidized bed reaction zones of successively smaller diameter;
   (b) introducing a polymerization catalyst into an uppermost one of said zones;
   (c) polymerizing said gaseous monomers to form solid polymer particles which are a part of a fluidized bed in each zone and which flow downwardly through the series of reaction zones, and thereby decreasing a volumetric flow rate of said upwardly flowing gaseous stream as said stream moves upward;
   (d) maintaining a velocity of said upwardly flowing gaseous stream sufficient to fluidize the fluidized bed in each successive zone at least partially by means of the smaller diameter of each successive zone; and
   (e) modifying a monomer-to-comonomer ratio from bed to bed by feeding additional amounts of one of said first and second gaseous monomers into at least one reaction zone above a lowermost one of said reaction zones.

7. A process for vapor phase polymerization of a gaseous monomer, comprising:
   (a) passing a gaseous stream containing at least one gaseous monomer upwardly through a series of fluidized bed reaction zones;
   (b) introducing a polymerization catalyst into an uppermost one of said zones;
   (c) polymerizing said gaseous monomer to form solid polymer particles which are a part of a fluidized bed in each zone and which flow downwardly through the series of reaction zones, at least one of said reaction zones being divided into a plurality of subzones by at least one divider wall having openings therethrough of dimensions larger than said solid polymer particles when said particles are first introduced into said one reaction zone;

(d) as said particles flow downwardly through said series of reaction zones, passing said particles into a first one of said subzones of said one reaction zone from an upwardly adjacent reaction zone; and (e) passing said polymer particles laterally through said openings of a first one of said divider walls to a second one of said subzones while preventing any substantial backflow of particles from said second subzone to said first subzone.

8. The process of claim 7, further comprising the steps of:

passing said polymer particles laterally through the openings of a second one of said divider walls to a third one of said subzones while preventing any substantial backflow of particles from said third subzone to said second subzone.

9. The process of claim 7, further comprising the step of:

passing said polymer particles downward from a lattermost one of said subzones to a downwardly adjacent zone.

* * * * *

UNITED STATES PATENT AND TRADEMARK OFFICE
CERTIFICATE OF CORRECTION

PATENT NO. : 5,235,009
DATED : August 10, 1993
INVENTOR(S) : John P. Hogan

It is certified that error appears in the above-identified patent and that said Letters Patent is hereby corrected as shown below:

Column 7, line 24, after "gaseous" and before "upwardly", insert --monomer--.

Signed and Sealed this

Twenty-sixth Day of April, 1994

Attest:

BRUCE LEHMAN

Attesting Officer

Commissioner of Patents and Trademarks